Oct. 28, 1969  R. GERMERDONK  3,474,850
LIQUID FILM EVAPORATOR

Filed Sept. 28, 1967  2 Sheets-Sheet 1

INVENTOR.
ROLF GERMERDONK
BY Burgers, Dinklage
and Sprung
Attorneys

INVENTOR.
ROLF GERMERDONK

United States Patent Office 3,474,850
Patented Oct. 28, 1969

3,474,850
LIQUID FILM EVAPORATOR
Rolf Germerdonk, Schildgen, Germany, assignor to Farbenfabriken Bayer Aktiengesellschaft, Leverkusen, Germany, a corporation of Germany
Filed Sept. 28, 1967, Ser. No. 671,338
Claims priority, application Germany, Oct. 14, 1966, F 50,442
Int. Cl. B01d 1/22
U.S. Cl. 159—6　　　　　　　　　　　　　　5 Claims

ABSTRACT OF THE DISCLOSURE

The inner surface of a cylindrical housing of a wiped thin film evaporator apparatus is covered with a thin film of liquid to be evaporated. Wiper blades, fixed on a rotating shaft, operate in close relation to said inner surface of said housing, continuously generating the liquid film. A ring wall of small mesh fabric is fixed on said rotatable shaft to assemble the liquid drops contained in the produced vapor and substantially to return them to said film.

---

The invention relates to a liquid film evaporator having blades of a rotatable wiper blade ring arranged in the axial main direction and having a drop separator revolving with the ring.

In the known drop separators of this type, prismatic sheet metal profiles are usually arranged on a circumference which is smaller than the circumference on which the wiper blade edges facing the liquid film on the evaporator surface revolve, so that the vapour is sharply deflected once or several times in travelling from the liquid film towards the interior of the evaporator, in which, for example, a condenser can be arranged. The drops entrained by the vapour are deposited on the surface of the deflector plates, and are then thrown off again by the revolving surfaces in the direction of the liquid film as a result of centrifugal forces.

It has been found that such deflector plates are able to separate relatively large drops very satisfactorily from the vapour stream, but are not very well able to separate out relatively small drops, such as those with diameters below 10μ.

By improving the drop separator through the introduction of multiple deflector plates, the pressure loss and the overall length are considerably increased. This means that, with an improved drop separation, the boiling temperature in the liquid film rises at constant pressure on the vacuum connection of the liquid film evaporator, and also that the space available inside the wiper ring for the free extraction of the vapours or for the arrangement of a condenser becomes very constricted.

It has now been found that these disadvantages and difficulties are obviated and high degrees of separation are produced if the wiper blade ring is equipped according to the invention, on its side facing the interior of the evaporator, with a wall of close-mesh, looped wire net.

Within the close-mesh looped net, large drops are always formed again by the running together of the separated small drops, and these large drops, because of the centrifugal forces, are accelerated from the separator opposite to the flow of vapour in the direction of the origin of the drops, so that they are also able to overcome the capillary forces occurring in the close-mesh wire net. Thus, it is possible for the specific drop loading of the revolving close-mesh net or gauze fabric in kg. of drops per hour and per square metre and also the vapour speed, to be increased in relation to the revolving deflector plates without there being any danger of the passage of the large drops formed in the separator in the direction of flow of the vapour. On account of the high separating action of the close-mesh wire gauze, it is possible to work with small layer thicknesses. Thus, for the revolving close-mesh separator, a layer thickness of about 15 mm. is sufficient in order to achieve better degrees of separation in liquid film evaporators than is possible with the usual prismatic deflector plates. This applies especially to heavily loaded liquid film evaporators, i.e. for high specific vaporising capacities in kg. of distillate per hour and per square metre of heating surface, and thus also for large quantities of drops per hour and per square metre of drop separator surface.

By fitting the wiper blade ring with a wire mesh as a concurrently rotating drop separator, it is also possible to achieve an improvement in the separation effect with the distillation of mixtures in the liquid film evaporator, especially when the quantity of liquid entrained from the liquid film by the vapour is not extremely small in relation to the quantity in the sump, i.e. when there is a high evaporisation rate, because the mass transfer between the vapour and the droplets separated out in the wire mesh is very good.

The rectifying action of the concurrently rotating wire mesh can be further increased if the latter is so arranged on the wiper bars that it is partially immersed in the boiling surface of the liquid film. This can for example be achieved with wiper bars which are very narrow radially.

It is also possible with the known arrangement for rectifying in the fine vacuum range with 1 to 20 mm. Hg, in which a cooled cylinder or prismatic body with star-shaped cross-section revolves as a condenser inside an externally heated vertical cylinder, to improve the separating effect by a hollow cylinder of close-mesh looped wire mesh in accordance with the invention revolving with the condenser, whereby the drops centrifuged from the condenser enter into material exchange with the vapour within the wire mesh over a longer period of time than when there is unobstructed flow from the condenser to the heating surface.

Embodiments of the invention are shown diagrammatically and by way of example in the drawing.

Figure 1:
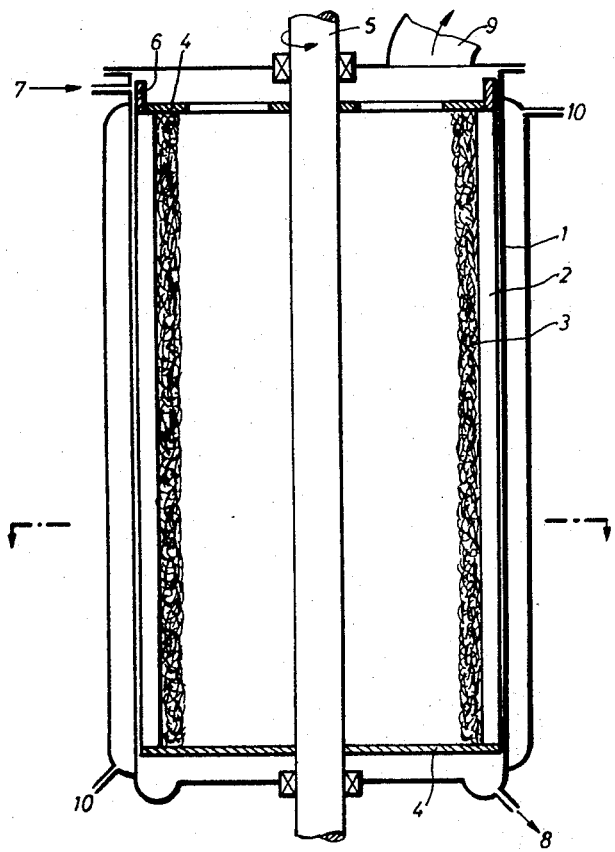
FIGURE 1 is a longitudinal section through an upright cylindrical evaporator element with a wiper ring and a looped wire net or gauze.
Figure 2:
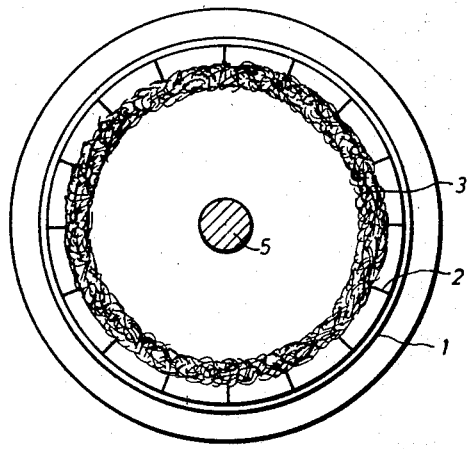
FIGURE 2 illustrates a cross-section through this evaporator element.

In detail, the reference 1 represents the externally heated cylindrical evaporator surface, in front of which wiper bars 2 are in known manner moved at a small distance away to generate the liquid film. The wiper bars 2, together with the cover plates 4, form the holding frame for the drop separator 3 consisting of close-mesh wire gauze. The cover plates 4 are connected fast to the driving shaft 5, so that the parts 2, 3, 4 and 5 rotate together. The liquid to be vaporised enters at 7, is distributed in known manner by the ring 6 uniformly over the circumference of the heating wall 1, and then flows downwardly as a thin film with a surface which is constantly renewed by the wipers 2. The substances which have not evaporated are drawn off at 8. The vapour which is produced flows with the drops entrained by the vapour through the ring of wiper bars 2 and the drop separator 3. Here, the vapour and the entrained drops are separated. The small drops which are separated out are combined in the wire gauze into large drops, which are again thrown off by centrifugal force in the direction of the heating surface 1. The droplet-free vapour flows through the openings in the upper cover plate 4 to the pipe connection 9, to which is connected the pipe to the condenser and possibly to the vacuum pump. The heating medium is supplied and discharged in known manner through the pipe unions 10 in the heating jacket or wall 1.

Figure 3:
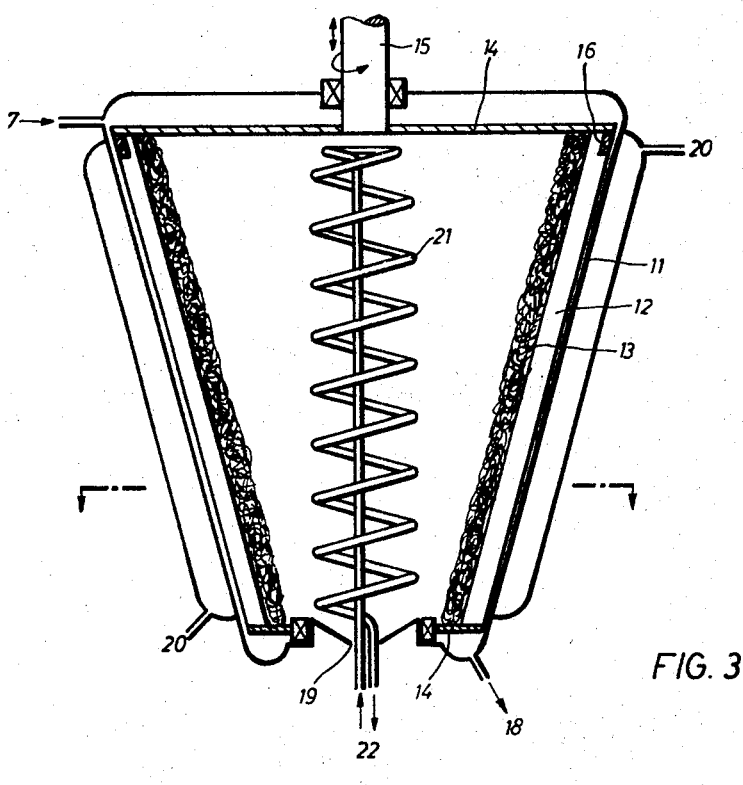
FIGURE 3 shows a conical evaporator element with a built-in condenser and a wiper ring with a looped wire gauze, shown in longitudinal section.
Figure 4:
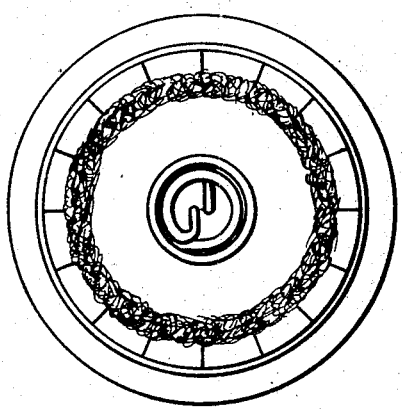
FIGURE 4 is a cross-section through the arrangement according to FIGURE 3.

The liquid film evaporator which is shown in FIGURES 3 and 4 has a condenser 21 arranged inside the rotating wiper 12; the evaporator is suitable as a short-path distillation apparatus for evaporation at pressures smaller than, or equal to, 1 mm. Hg. The product flowing in at 17 flows downwardly along the conical heating wall 11, which is heated from the outside by the heating medium entering and discharging at 20, the substances which have not evaporated discharging at 18. The parts consisting of the wiper bars 12, the cover plates 14 and the shaft 15 together form the rotor, which can be made shiftable in known manner along the main axis to adjust the gap between the wiper bars 12 and the heating wall 11, and thus also to influence the thickness of the liquid film. The vapour and the small liquid droplets entrained by the vapour flow between the wiper bars 12 into the drop separator 13, which consists according to the invention of a hollow cone of close-mesh, looped wire gauze and rotates together with the parts 12, 14 and 15. In the drop separator 13, the small liquid drops are separated out on the wires and merge into large drops, and the latter, because of the centrifugal forces acting thereon, are thrown off outwardly in the direction of the heating wall 11 against the capillary forces. The drop-free vapour continues to flow to the fixed condenser 21 with the inlets and outlets 22 for the coolant, the vapour being liquified thereon. The distillate discharges at 19.

I claim:
1. A thin film evaporator apparatus for evaporating liquids, which comprises a cylindrical housing with an inlet opening for the liquid, an outlet opening for the concentrate, and an outlet opening for the produced vapor, means for heating the inner surface of said housing which is covered by a thin film of liquid, a rotatable shaft arranged inside said housing, said shaft including carrier means fixed on said shaft, wiper blades lying in radial planes and extending parallel to the axis of rotation borne by said carrier means to operate in close proximity to the inner surface of said housing, and a cylindrical ring wall of small mesh fabric connected to said carrier means contiguous to and in spaced relation to said inner edges of the blades to assemble the liquid drops contained in the produced vapor and centrifuge them to the housing inner surface.

2. A thin film evaporator apparatus according to claim 1, wherein said ring wall of fabric includes several layers of gauze.

3. A thin film evaporator apparatus according to claim 1, wherein said ring wall of fabric is partially immersed into said film of liquid covering the inner surface of said housing.

4. A thin film evaporator apparatus according to claim 1, wherein said fabric is gauze.

5. A thin film evaporator apparatus according to claim 1, wherein said fabric is net.

References Cited
UNITED STATES PATENTS

| | | | |
|---|---|---|---|
| 2,040,837 | 5/1936 | D'Yarmett | 196—90 |
| 2,313,546 | 3/1943 | Hickman | 203—89 X |
| 2,542,270 | 2/1951 | Zahm. | |
| 2,546,381 | 3/1951 | Zahm. | |

NORMAN YUDKOFF, Primary Examiner

J. SOFER, Assistant Examiner